United States Patent
López et al.

(10) Patent No.: US 6,538,235 B2
(45) Date of Patent: Mar. 25, 2003

(54) DE-ICING SYSTEM

(75) Inventors: Miguel Mota López, Rubi (ES); Juan Jesus Elvira Peralta, Rubi (ES)

(73) Assignee: Fico Transpar, S.A., Rubi (ES)

( * ) Notice: Subject to any disclaimer, the term of this patent is extended or adjusted under 35 U.S.C. 154(b) by 0 days.

(21) Appl. No.: 09/877,703

(22) Filed: Jun. 8, 2001

(65) Prior Publication Data

US 2002/0040895 A1 Apr. 11, 2002

(30) Foreign Application Priority Data

Jun. 8, 2000 (DE) .......................... 100 28 362

(51) Int. Cl.⁷ .................................. B60L 1/02
(52) U.S. Cl. ..................... 219/202; 239/284.1
(58) Field of Search .................. 219/202, 203; 392/441, 442; 165/202; 239/128, 284.1

(56) References Cited

U.S. PATENT DOCUMENTS

| | | | | |
|---|---|---|---|---|
| 3,716,886 A | * | 2/1973 | Klomp | 15/250.04 |
| 3,888,412 A | * | 6/1975 | Lindo | 237/12.3 B |
| 4,508,957 A | * | 4/1985 | Rocchitelli | 137/341 |
| 5,118,040 A | * | 6/1992 | Abe | 15/250.05 |
| 5,509,606 A | * | 4/1996 | Breithaupt et al. | 239/130 |
| 5,927,608 A | * | 7/1999 | Scorsiroli | 239/284.1 |
| 5,957,384 A | * | 9/1999 | Lansinger | 239/284.1 |
| 5,979,796 A | * | 11/1999 | Ponziani et al. | 239/284.1 |
| 6,029,908 A | * | 2/2000 | Petzold | 239/128 |
| 6,032,324 A | * | 3/2000 | Lansinger | 15/250.04 |
| 6,247,653 B1 | * | 6/2001 | Seyfarth et al. | 239/284.1 |

FOREIGN PATENT DOCUMENTS

| | | |
|---|---|---|
| DE | 44 06 653 A | 9/1995 |
| DE | 197 15 395 A1 | 10/1998 |
| DE | 197 44 852 A1 | 4/1999 |

* cited by examiner

*Primary Examiner*—Teresa Walberg
*Assistant Examiner*—Vinod D. Patel
(74) *Attorney, Agent, or Firm*—Renner, Otto, Boisselle & Sklar, LLP

(57) ABSTRACT

A de-icing system for de-icing a window pane, in particular a window pane of a motor vehicle, comprising a reservoir for receiving a de-icing liquid, a heating element for heating the de-icing liquid, a pump for pumping the de-icing liquid from the reservoir through the heating element to at least one outlet, wherein the at least one outlet is shaped such that the heated de-icing liquid is nebulized and precipitates as distributed hot droplets on the window pane to be de-iced.

18 Claims, 2 Drawing Sheets

DE-ICING SYSTEM

TECHNICAL FIELD

Figure 1:
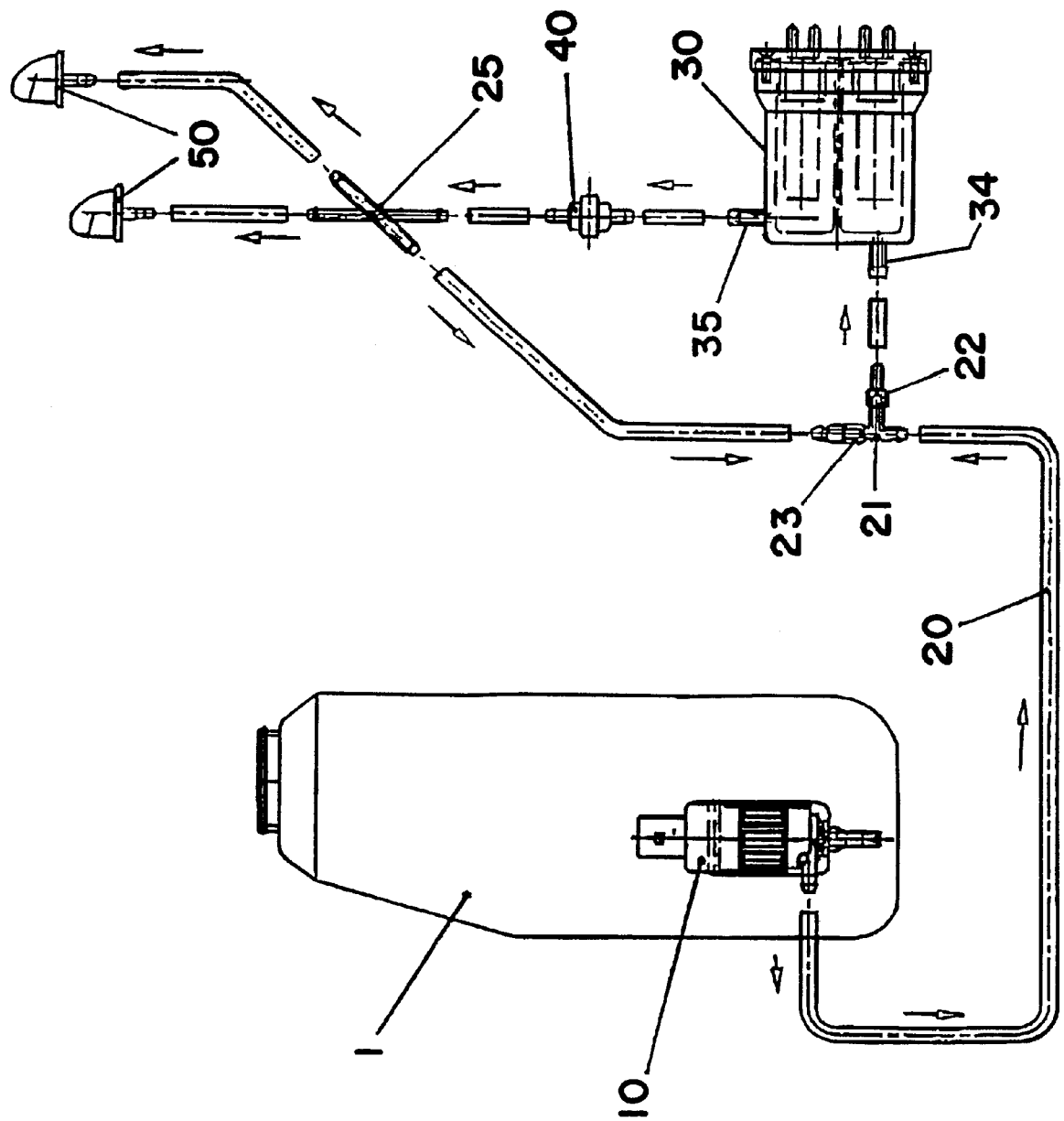

The present invention relates to a de-icing system for de-icing a window pane, in particular a window pane of a motor vehicle.

THE PRIOR ART

In vehicles of all kinds there is often during the cold season the problem of the icing of window panes. For example, windscreens of motor vehicles parking overnight in the open air are at freezing temperatures typically coated with a thin ice layer. The manual mechanical removal of this ice layer is tedious and time-consuming, so that in many cases the ice is only removed from a small part of the windscreen before the start of driving. As a result, the visibility is during the first kilometers of driving often substantially limited with corresponding consequences for the active security of the vehicle.

In order to overcome this difficulty it has been known for a long time in the prior art to use systems serving at normal temperatures for cleaning the window pane also for de-icing. Such installations typically comprise a pump spraying a cleaning liquid from a reservoir with one or several nozzles onto the windscreen. The cleaning liquid is provided onto the windscreen with a directed jet from the nozzle, which is only insignificantly influenced by the relative wind, so that the window pane can also be cleaned during driving, and subsequently distributed by operating the windscreen wipers.

In order to additionally de-ice the window pane with such a system, it was suggested to heat the cleaning liquid to an increased temperature so that the ice layer is released and/or thawed, when the hot liquid is sprayed on.

An example of such a device is disclosed in the DE 44 06 653. Here, an isolated container with a resistive heating is arranged in a pipe between the reservoir containing the cleaning liquid and two nozzles. The volume of the isolated container allows a repeated spraying of preheated cleaning liquid onto the window pane of the vehicle.

Apart from the considerable expenditure and the costs caused by mounting the special isolated container, the system according to the DE 44 06 653 puts a load on the battery of the vehicle, since the temperature of the cleaning liquid is constantly kept at an increased temperature. In order to limit the power consumption, the DE 44 06 653 discloses a complicate electric circuitry starting the heating only if the temperature of the cleaning liquid in the isolated container falls below a predetermined temperature. In case of longer standstill times of the vehicle the heating is completely turned off for protecting the battery. Thus, the cleaning liquid cools off overnight in spite of the isolation, so that there is no hot liquid available when the vehicle is started in the morning, but the cleaning liquid must at first be slowly heated in the large isolated container.

A further device for heating the cleaning liquid is disclosed in the U.S. Pat. No. 5,354,965. Here, the amount of cleaning liquid required for each spraying process is heated in a U-shaped heated tube or a small metal container prior to each spraying process in response to pressing a button. After a repeated pressing of the button, the heated liquid is sprayed through a pump onto the window pane. After the end of the spraying process, it is by a suitable arrangement of the metal container with respect to the nozzles and the arrangement of the pipes to the reservoir assured, that the amount of cleaning liquid necessary for the next spraying process remains in the U-shaped tube or the metal container. As a consequence, the installation of this system is difficult, since a reliable operation is only achieved, if the reservoir, the pipes and the U-shaped tube or the metal container are correctly arranged.

Since the metal container or the U-shaped tube are constantly in direct connection with the rest of the assembly, the thermal isolation is comparatively low, so that also here heating times of approximately two minutes are required prior to each "shot".

Heating times of this length are disadvantageous in particular since in both systems according to the DE 44 06 653 and according to the U.S. Pat. No. 5,354,965 a significant de-icing effect is not obtained by a single spraying, even with heated cleaning liquid. The same applies to a further heating system, as it is disclosed in the DE 197 15 359. Since in all of these prior art systems the directed jet of cleaning liquid hits the window pane only in a small part and is to be distributed subsequently by means of the windscreen wipers, at best, only a small part of the window pane thaws, in particular since the window wipers are typically rigidly frozen to the window pane. A quick, de-icing of a large area, which is the precondition for a clear view is not obtained by the systems according to the prior art. Also the repeated application cannot substantially change this, since only the same small part of the window pane is hit by the jet of the heated cleaning liquid.

According to a first aspect, it is the problem of the present invention to provide a de-icing system for a window pane of a vehicle, in particular a motor vehicle, which removes in a short time great parts of an ice layer from the window pane.

According to a further aspect of the present invention, a simple and cost efficient system is to be provided, which heats in a short time the amount of liquid necessary for de-icing and deposits it onto the window pane even after long standstill times of the vehicle, in order to overcome the above mentioned disadvantages of the prior art.

SUMMARY OF THE INVENTION

The present invention relates to a de-icing system for de-icing a window pane, in particular a window pane of a motor vehicle with a reservoir for receiving a de-icing liquid, a heating unit for heating the de-icing liquid, a pump pumping the de-icing liquid from the reservoir through the heating unit to at least one outlet, wherein the at least one outlet is shaped such that the heated de-icing liquid is nebulized and precipitates as distributed hot droplets on the window pane to be de-iced.

Thus, the liquid is in contrast to the washing systems from the prior art with an additional heating by the de-icing system according to the invention not deposited in the form of one or more jets directed to the window pane and subsequently distributed by the windscreen wipers but the nebulization according to the invention creates a cloud of dispersed hot droplets above the window pane to be de-iced, which de-ice large areas of the window pane during precipitation. The temperature and the size of the droplets is dimensioned so that their thermal energy is sufficient to respectively thaw a small area of the ice layer. Preferably, the hot droplets have a diameter between 0.5 mm and 1 mm.

Tests have shown, that a single "shot" with the de-icing system according to the invention is for temperatures of down to −30° C. sufficient to free the major part of a windscreen of a vehicle in a few seconds from the ice.

Preferably, the outlet distributes the hot droplets of the de-icing liquid in a fan-shaped manner over the window pane.

Figure 2:
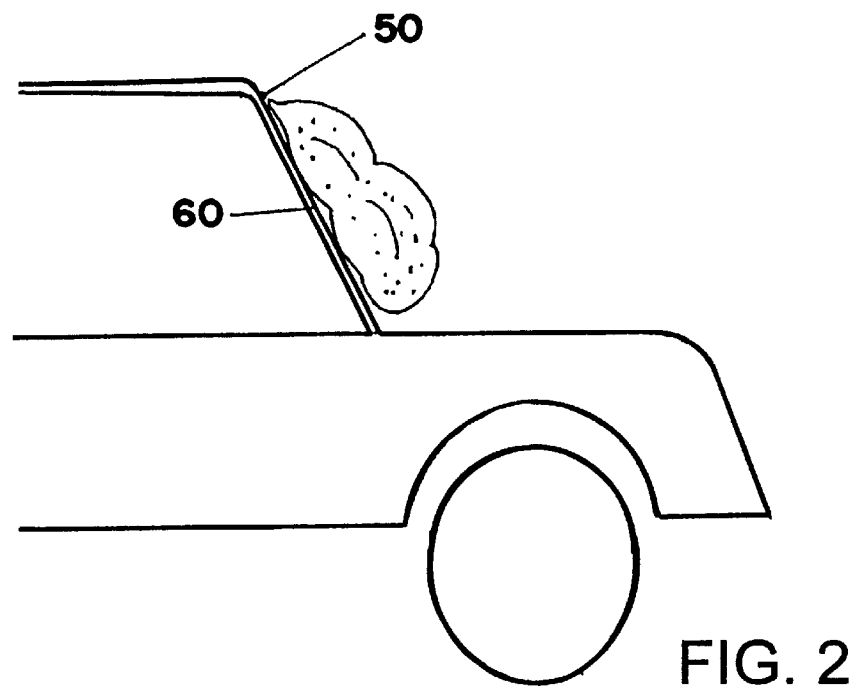
Figure 3:
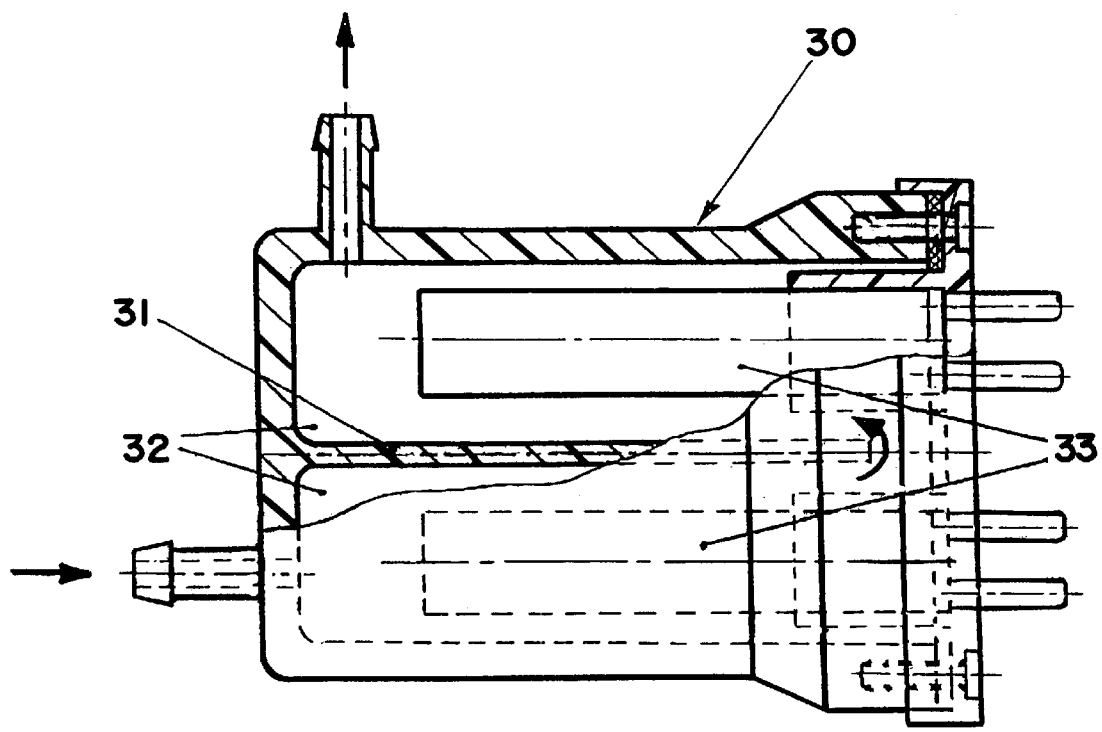

In order to shorten in accordance with a further aspect of the present invention, the preparation time for de-icing the window pane in any arbitrary situation, the heating unit heats preferably only the respectively required amount of de-icing liquid for a single nebulization process—preferably directly before the nebulization process. Thus, on the one hand an expensive thermal isolation is not necessary and on the other hand the complex electric circuitries of the prior art for protecting the batteries are nor required.

In a particular preferred embodiment, a first valve is arranged between the reservoir and the heating unit and a second valve is arranged between the heating unit and at least one outlet in order to separate the amount of de-icing liquid necessary for one nebulization process from the remaining de-icing liquid during heating. This improves the thermal isolation of the amount of de-icing liquid necessary for a nebulization process and thus shortens significantly the heating time.

Preferably, the first and second valve are hydraulically opened by starting the pump. Whereas the first valve is preferably provided as a non-return valve, the second valve is preferably provided such that it remains closed against the pressure developing during heating of the de-icing liquid in the heating unit and opens only under an additional pressure increase by starting the pump. Due to the provision and the properties of both valves no requirements concerning the vertical position of the heating unit with respect to the pipes or the reservoir must be, met when the system is installed. On the other hand, expensive electromagnetically controlled valves which are susceptible to trouble are not necessary.

In a particularly preferred embodiment of the present invention the pump starts automatically, if the de-icing liquid arranged in the heating unit has reached a predetermined temperature. Alternatively, the pump can be also automatically started a predetermined time after the beginning of heating.

Further preferred developments are the subject matter of further dependent claims.

SHORT DESCRIPTION OF THE DRAWING

In the following detailed description a presently preferred embodiment of the present invention is described with reference to the drawing which shows:

FIG. 1: A schematic representation of the elements of a preferred embodiment of the present invention;

FIG. 2: A schematic representation of the cloud of hot droplets of the de-icing liquid produced by the de-icing system according to the invention; and FIG. 3: A detailed representation of the heating unit in the preferred embodiment of FIG. 1.

DETAILED DESCRIPTION OF THE INVENTION

In the following a preferred embodiment of the present invention is described with reference to a de-icing system for the windshield of a motor vehicle. However, it is to be understood that the present invention can also be used for the de-icing of window panes of other vehicles as for example trains or aircrafts.

With reference to FIG. 1 the de-icing system according to the invention comprises a reservoir 1 serving for receiving the de-icing liquid. Depending on the type of the vehicle and the space available below the hood the reservoir 1 has different sizes and shapes. The de-icing liquid is preferably a mixture of water and an alcohol, for example isopropanol. The fraction of the alcohol is preferably 50%. For use in extremely cold regions also mixtures with a significantly higher fraction of alcohol can be used in order to avoid a freezing of the de-icing liquid.

By means of a pump 10 the de-icing liquid is pumped from the reservoir 1 in the direction of the arrow (cf. FIG. 1). The pump 10 can be arranged inside or outside the reservoir 1 without any influence on the construction according to the invention. The pump 10 can be a unit as it is known from the prior art for screen washer systems of motor vehicles.

Via a pipe section 20 the de-icing liquid reaches a T-piece-like branching 21 followed each by two non-return valves 22, 23. The non-return valves 22, 23 are arranged such that the de-icing liquid flows during operation of the pump 10 through the non-return valve 22 in the direction of the small horizontal arrow to the heating unit 30. The upward directed branch of the pipe is blocked by the non-retum valve 23, so that the complete de-icing liquid delivered by the pump 10 is guided to the heating unit 30. When unused de-icing liquid runs back from the nebulizers 50 (see below) the non-return valve 23 opens so that the column of de-icing liquid above can flow back into the reservoir 1.

The heating unit 30 (cf. detailed representation in FIG. 3) serves for the fast heating of the amount of de-icing liquid required for a de-icing process. This amount will vary depending on the size of the pane to be de-iced; typically volumes are in the range of approximately 100 ml. This is the amount of de-icing liquid necessary for a single "shot" of the system (time period approximately 3 seconds).

Preferably, two heating elements 33 are arranged in a chamber 32 of the heating unit 30 separated by an intermediate wall 31. The heating elements 33 are preferably PTC (positive temperature coefficient) thermistors. Conceivable is also the use of other heating units as for example normal resistive wires or the like. The PTC thermistors, however, show due to the increase of the electric resistance with increasing temperatures an advantageous self regulating effect, which avoids an overloading of the battery of the vehicle. Typical power consumptions are between 800 and 1000 W. The heat capacity of the PTC-thermistors is comparatively low so that the supplied electric power is without time delay directly released as heat.

When a de-icing process is started, for example by the single operation of an electric switch in the interior of the vehicle, the heat element 30 starts to heat the cold liquid arranged in the chamber 32. In order to bring the liquid as fast as possible to the predetermined temperature, the non-return valve 22 is arranged for a thermal isolation at the inlet 34 and a further valve 40 is arranged at the outlet 35 (cf. FIG. 1). This valve 40 is designed such that it can resist the pressure of the liquid arising during heating in the heating unit 30, i.e. it blocks at first the pipe to the nebulizers. Typical pressures arising during heating are in the range of 1 to 2 bar, preferably the pressure is 1.8 bar.

Only if additional liquid enters due to the delivery pressure (approximately 2 to 4 bar) of the started pump 10 the heating unit 30. the pressure further increases there and the valve 40 is opened so that the de-icing liquid can reach the nebulizers 50. Simultaneously, the heating is turned off. This pressure-dependent opening of the valve 40 can for example be achieved by subjecting a sealing flap in the valve 40 to the force of an elastic spring.

By the preferred lateral direction of flow into the heating unit 30 indicated in FIG. 2 with arrows and the vertical outlet direction it is assured that only the heated liquid reaches the nebulizers 50. A mixing with the additionally cold liquid streaming in is thus avoided. The pump 10 is turned off when the chamber 32 is exclusively filled with cold de-icing liquid.

The complete separation of the liquid heated in the heating unit 30 from the remaining de-icing liquid allows to reach within a very short time (approximately 30 to 60 seconds) temperatures between 50 C. and 100 C. Preferably, the temperature at which the pump 10 is started, is 65 C. For controlling either an additional temperature sensor can either be provided in the heating unit (not shown) providing a start signal for the pump 10 when the predetermined temperature is reached or the pump is activated by a timer adjusted on the basis of experimental values for the heating time (for example 45 seconds). In both cases an additional operation of the switch in the interior of the vehicle is not necessary.

The required logic for the operation of the de-icing system according to the invention is extremely simple and can therefore be cost efficiently realized. Neither any electro-magnetic switching valves nor sophisticated security circuits are necessary in order to avoid a complete discharging of the battery. The reason is that the described heating unit 30 is due to its design according to the invention capable to very fast heat the required liquid for de-icing immediately prior to each application so that a constant operation is not necessary. By means of the further pipe system 25 which is only schematically indicated in FIG. 1, the heated liquid reaches during operation of the pump 10 one or more nebulizers 50. As schematically shown in FIG. 2 these nebulizers 50 create a cloud of droplets over the window pane 60 to be de-iced where the thermal energy stored in the de-icing liquid de-ices during precipitation abruptly large areas of the window pane 60.

In contrast to known nozzles of a washing system from the prior art it is not a more or less focused jet which is directed to the window pane 60 but a wetting with dispersed hot droplets occurs under the influence of gravity. Thus, the effect on a large area is substantially obtained by the nebulizers 50 an d not by a subsequent operation of the screen wipers.

The nebulizers 50 are designed so that the created droplets are on the one hand sufficiently big to precipitate directly on the window pane 60 and that they are on the other hand sufficiently dispersed to achieve a continuous de-icing of the window pane 60. In the described preferred embodiment this is achieved with droplets having a diameter between 0.5 mm and 1 mm. Thus, a single "shot" of approximately 100 ml de-icing liquid is able at the above mentioned temperature of the de-icing liquid of preferably 65° C. to abruptly de-ice almost the complete windscreen. The outgoing speed of the droplets from the nebulizers 50 is preferably approximately 27 m/s.

Although the nebulizers 50 are shown in FIG. 2 to be mounted to the upper edge of the window pane 60, also other ways of installation are possible. For example, the cloud created by the nebulizers 50 can also be directed from the front or the side onto the window pane 60.

The described de-icing system can be either mounted during the production of the vehicle or it can be later backfitted. Elements of an already existing washing system can also be used for the backfitted de-icing system. Only the heating element 30 and the nebulizers 50 as well as corresponding additions to the pipe system must be added or correspondingly modified. Also the necessary control lines in the interior of the vehicle are restricted to a minimum, since only a single switch is necessary for operating the de-icing system according to the invention.

Preferably plastic materials are used as materials for the de-icing system according to the invention, since they can be cost-efficiently manufactured and have a low weight. Only the heating unit is due to the high temperatures and pressures preferably made out of a metal, for example aluminum which is coated with a plastic.

What is claimed is:

1. De-icing system for de-icing a window pane, in particular a window pane of a motor vehicle, comprising:
    a reservoir for receiving a de-icing liquid;
    a heating unit for heating the de-icing liquid; and
    a pump for pumping the de-icing liquid from the reservoir through the heating unit to at least one outlet;
    wherein the at least one outlet is shaped so that the heated de-icing liquid is finely nebulized and precipitates as dispersed hot droplets into the window pane to be de-iced.

2. A de-icing system according to claim 1, wherein the hot droplets have a diameter between 0.5 mm and 1 mm.

3. A de-icing system according to claim 1, wherein the outlet distributes the hot droplets of the de-icing liquid in a fan-shaped manner over the window pane.

4. A de-icing system according to claim 1, wherein the heating unit heats only the amount of de-icing liquid necessary for a single nebulizing process.

5. A de-icing system according to claim 4, wherein the heating unit heats the required amount of de-icing liquid only directly before the nebulizing process.

6. A de-icing system according to claim 5, wherein the required amount of de-icing liquid is between 50 ml and 150 ml.

7. A de-icing system according to claim 6, wherein the required amount is approximately 100 ml.

8. A de-icing system according to claim 5, wherein a first valve is arranged between the reservoir and the heating unit and a second valve is arranged between the heating unit and the at least one outlet to separate the amount of de-icing liquid necessary for a nebulizing process from the remaining de-icing liquid during heating.

9. A de-icing system according to claim 8, wherein the first and the second valve are hydraulically opened by starting the pump.

10. A de-icing system according to claim 9, wherein the first valve is provided as a non-return valve.

11. A de-icing system according to claim 9, wherein the second valve is provided so that it remains closed against the pressure arising during heating the de-icing liquid in the heating unit and opens only under the additional pressure increase caused by starting the pump.

12. A de-icing system according to claim 11, wherein the starting of the pump is performed automatically, if the de-icing liquid arranged in the heating unit has reached a predetermined temperature.

13. A de-icing system according to claim 12, wherein the starting of the pump is performed automatically a certain time after starting the heating.

14. A de-icing system according to claim 4, wherein the heating unit comprises at least one PTC-thermistor for heating the de-icing liquid.

15. A de-icing system according to claim 1, wherein the de-icing liquid is heated to a temperature of approximately 65 C.

16. A de-icing system according to claim 1, wherein the de-icing liquid is a mixture of water and alcohol.

17. A de-icing system according to claim 16, wherein the alcohol content of the mixture is 50%.

18. A de-icing system for de-icing a window pane, in particular a window pane of a motor vehicle, comprising:
- a reservoir for receiving a de-icing liquid;
- a heating unit for heating the de-icing liquid;
- a pump for pumping the de-icing liquid from the reservoir through the heating unit to at least one outlet; and
- a first valve arranged between the reservoir and the heating unit and a second valve arranged between the reservoir and the at least one outlet to separate the amount of de-icing liquid necessary for a single de-icing process from the remaining de-icing liquid during the heating; wherein the valves are hydraulically opened when the pump is started.

* * * * *